United States Patent [19]

Gerkema

[11] Patent Number: 4,641,332

[45] Date of Patent: Feb. 3, 1987

[54] X-RAY TUBE COMPRISING ANODE DISC ROTATABLY SUPPORTED BY BEARING HAVING PUSH-PULL BEARING ON AN AXIAL FACE

[75] Inventor: Jan Gerkema, Eindhoven, Netherlands

[73] Assignee: U.S. Philips Corporation, New York, N.Y.

[21] Appl. No.: 667,945

[22] Filed: Nov. 2, 1984

[30] Foreign Application Priority Data

Nov. 8, 1983 [NL] Netherlands ................. 8303832

[51] Int. Cl.$^4$ ............................................. H01J 35/10
[52] U.S. Cl. ................... 378/125; 378/132; 378/133
[58] Field of Search .............. 378/132, 133, 135, 125, 378/144; 384/107, 121, 123, 378, 369

[56] References Cited

U.S. PATENT DOCUMENTS

| 3,376,083 | 4/1968 | Muijerman | 384/123 |
| 3,870,382 | 3/1975 | Reinhoudt | 384/123 |
| 4,007,974 | 2/1977 | Huber | 384/123 |
| 4,210,371 | 7/1980 | Gerkema et al. | 378/133 |
| 4,357,555 | 11/1982 | Gerkema et al. | 378/135 |
| 4,413,356 | 1/1983 | Hartl | 378/132 |

FOREIGN PATENT DOCUMENTS 0163320 12/1980 Japan .
2055432 5/1979 United Kingdom .

OTHER PUBLICATIONS

Apfel, "The Tensile Strength of Liquids", Scientific America, vol. 227, No. 6, Dec. 1972, pp. 58-70.
Volman, "The Push-Pull Spiral-Groove Bearing-A Thrust Bearing with Self-Adjusting Internal Preloading", Philips Tech. Rev. 35, pp. 11-14, 1975 No. 1.

*Primary Examiner*—Craig E. Church
*Assistant Examiner*—Charles Wieland
*Attorney, Agent, or Firm*—David R. Treacy

[57] ABSTRACT

The bearing in an X-ray tube comprising a liquid metal lubricated helical-groove bearing is provided with a push-pull bearing at one or both end faces of a bearing member. Consequently, the bearing member need not be further secured so that, notably in the case of suitable cooling of the anode disc and the bearing, extremely precise positioning of the radiation object point in the tube can be achieved.

10 Claims, 2 Drawing Figures

X-RAY TUBE COMPRISING ANODE DISC ROTATABLY SUPPORTED BY BEARING HAVING PUSH-PULL BEARING ON AN AXIAL FACE

The invention relates to an X-ray tube comprising an anode disc which is rotatably supported by a helical-groove bearing.

An X-ray tube of this kind is known from GB No. 2,055,432 A corresponding U.S. Pat. No. 4,357,555. In the X-ray tube described therein, a rotatable anode system has a rotor journalled in a helical-groove bearing as well as in a magnetic bearing in order to achieve reliable suspension. The magnetic bearing serves notably for the axial positioning of the anode system. The addition of a magnetic bearing makes the X-ray tube substantially more expensive, and the comparatively strong magnetic fields of such a bearing can have a disturbing effect, for example, on the X-ray image intensifier/television network or on the electron beam in the X-ray tube itself.

It is the object of the invention to avoid the use of an additional magnetic or other bearing while maintaining the attractive properties of the helical-groove bearing. To this end, an X-ray tube in accordance with the invention is characterized in that an axially facing portion of the helical-groove bearing is constructed as a push-pull bearing in which a liquid metal lubricant cooperates with a pattern of helical grooves so that a comparatively strong negative pressure occurs at this area upon rotation of the bearing.

A comparatively strong negative pressure can be developed in a liquid, depending on liquid properties such as the surface energy of the liquid, and on secondary conditions such as the space in which the liquid is contained and the purity of the liquid. Such a negative pressure will be lost or will not be developed when vapor bubbles can readily occur in the liquid. In order to prevent such bubbles, inclusions in the liquid and acute wall portions of the liquid vessel must be avoided. For a suitable effect in this respect, the liquid should exhibit a comparatively strong adhesion to the wall. For a further description of these aspects reference is made to Scientific American 227, No. 6, 1972, pp. 58–71; for a more detailed description of a push-pull spiral-groove bearing as such, reference is made to Philips Technical Review Vol. 35, 1975, No. 1, pp. 11–14.

In a preferred embodiment of the invention the cooperating bearing surfaces are made of molybdenum and/or tungsten and the metal lubricant contains an alloy of Ga and Bi, (comma) In or Sn or a combination thereof. The cooperating axial bearing surfaces and the helical grooves provided therein do not comprise disturbing, acute transitions and have been suitably treated for wetting by a lubricant. The Ga, In, Sn alloy has a high surface energy and an adhesion to suitable wall materials which substantially exceeds the adhesion energy and will, therefore, be suitable for achieving a comparatively strong negative pressure. Upon rotation, the bearing thus produces a self-adjusting internal bias so that the bearing need not be positioned by further bearings.

In a further preferred embodiment, surfaces of the bearing which adjoin the cooperating bearing surfaces are provided with an anti-wetting layer which consists of titanium acetylacetonate dissolved in isopropanol as described in the U.S. patent application Ser. No. 667,944 filed simultaneously with the present Application.

In a preferred embodiment of the X-ray tube, a single helical-groove bearing has a cylindrical bearing member which is constructed as a push-pull helical groove bearing for providing support in the axial direction. At least one axial face of the bearing member has a helical-groove pattern which produces a negative pressure. A bearing thus constructed can be provided with ducts for circulating the lubricant of the bearing. When a unidirectional bearing would cause excessive unbalance of the anode disc with respect to the bearing, a counterweight could be mounted on a shaft portion of the anode disc which is remote from the anode disc. The X-ray tube comprising such a push-pull bearing notably has a ceramic support so that the anode can be maintained at any desired potential.

Figures 1, 2:
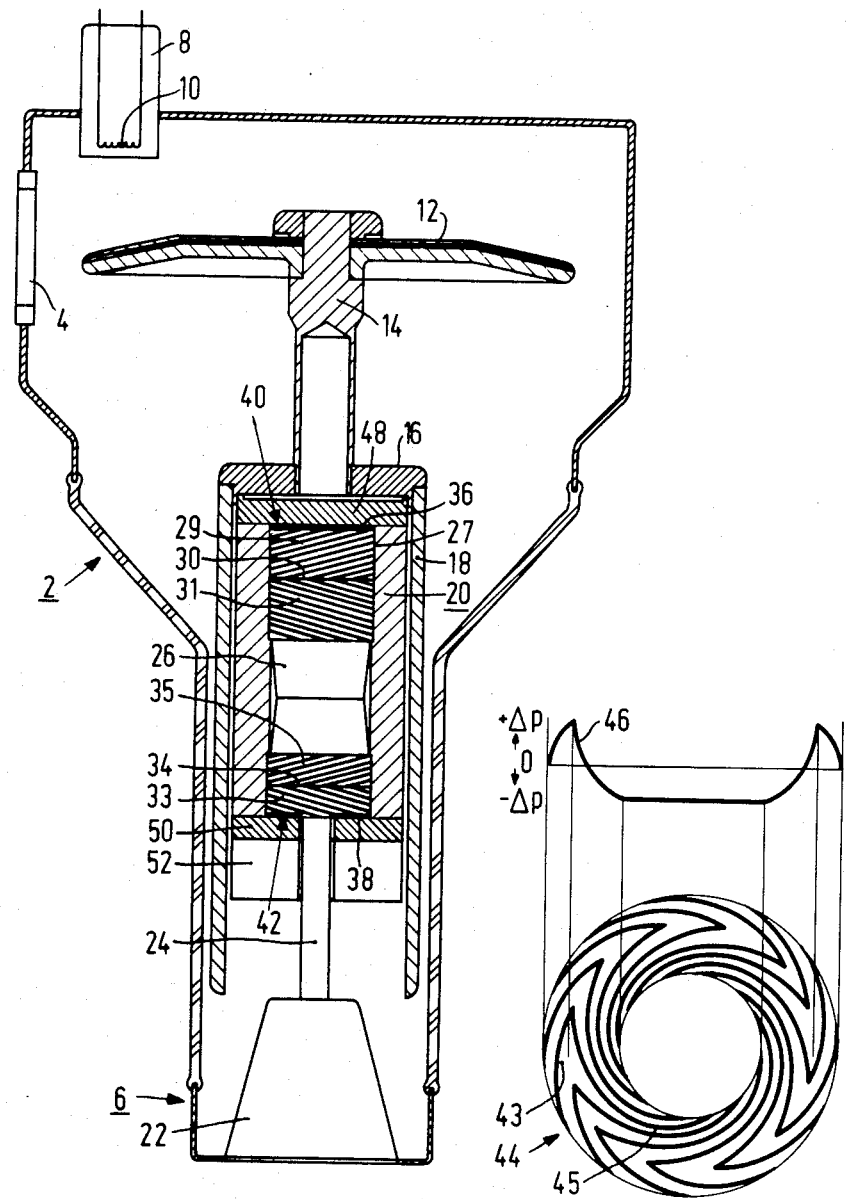
FIG. 1 shows cross-sectional view of the preferred embodiment of the invention.
FIG. 2 shows a front view and associated pressure distribution diagram of the axial face bearing of the preferred embodiment of the invention.

The preferred embodiments in accordance with the invention will be described in detail hereinafter with reference to the drawing. As shown in a cross-sectional view of FIG. 1, an X-ray tube comprises a tube 2 with a radiation exit window 4, a base 6, and a cathode device 8 with a filament 10. An anode disc 12 is mounted on an anode shaft 14. A rotor 18 and a bearing sleeve 20 are secured to anode shaft 14 by means of a mounting ring 16. The base 6 of the X-ray tube comprises, for example, a ceramic connection block 22 as described in U.S. Pat. No. 4,024,424. On the connection block 22 there is mounted a flexible, electrically conductive tube 24 having a cylindrical bearing member 26 mounted thereon.

The cylindrical bearing member 26 fits in the bearing sleeve 20 in both the radial and axial directions. On its cylindrical surface 27 the bearing member 26 comprises a helical-groove radial bearing having a first herringbone pattern 30 of helical grooves which is formed by two groove patterns 29 and 31 orientated in opposite directions. Member 26, as shown, also has an intermediate piece without grooves, (although this is deemed optional) and a second herring-bone pattern 34 of helical grooves which is formed by two oppositely orientated helical-groove patterns 33 and 35.

At its two axial faces 36 and 38 the bearing member 26 comprises push-pull helical groove axial bearings 40 and 42, each comprising a pattern of helical grooves 44, for example, as shown in a front view in FIG. 2. This helical-groove pattern is again a herring-bone pattern 44 formed by two oppositely orientated helical-groove patterns 43 and 45. The groove pattern 44 produces a pressure distribution Δp, as denoted by the reference numeral 46 in FIG. 2, when provided with a suitable lubricant. This is elaborated in greater detail in the aforementioned Philips Technical Review article. Both end faces 36 and 38 of the bearing member 26 may in principle be provided with such helical-groove bearings.

The bearing sleeve 20 and the boundary surfaces between the two end plates 48 and 50 are provided with an anti-wetting layer in order to prevent the escape of lubricant across these surfaces. The end plates 48 and 50 may be provided with ducts through which radially accumulated lubricant can be forced to circulate in the bearing member 26, thereby stimulating their lubrication.

A counterweight 52 may be mounted on the bearing sleeve 20 in order to eliminate any mass unbalance in the rotating anode system with respect to the bearing member 26. Notably when a cooling device is used in the X-ray tube in order to limit the temperature of the anode disc 12 and the bearing member 26, an extremely accurate positioning of a target for the electron beam and, hence, an object point for an X-ray beam to be emitted, can be permanently achieved. Consequently, in an X-ray apparatus comprising such an X-ray tube a suitably defined and stable beam geometry is obtained, thus improving the imaging quality of such an apparatus.

What is claimed is:

1. An X-ray tube comprising an anode disc which is rotatably supported by a bearing member comprising cylindrical and axial face components; the improvement therein comprising said bearing member having a push-pull bearing on an axial face, said axial face having a pattern of helical grooves on it, and a liquid metal lubricant cooperating with said pattern of helical grooves so that a comparatively strong negative pressure occurs on said axial face upon rotation of said bearing member.

2. An X-ray tube as claimed in claim 1, wherein said bearing member comprises bearing surfaces made of molybdenum or tungsten, or a combination thereof, and said metal lubricant contains a Ga alloy.

3. An X-ray tube as claimed in claim 2, wherein a titanium acetylacetonate anti-wetting layer coats boundary surfaces which adjoin said axial face of said bearing member.

4. An X-ray tube as claimed in claim 1, wherein said liquid metal lubricant contains one of the metals Bi, In and Sn or a combination thereof.

5. An X-ray tube as claimed in claim 1, wherein a rotary shaft is provided and said anode disc is mounted on said rotary shaft which has a rotor and a bearing sleeve.

6. An X-ray tube as claimed in claim 5, wherein said bearing sleeve comprises ducts for circulation of said lubricant.

7. An X-ray tube as claimed in claim 1, wherein said bearing member is constructed to be double-acting, said bearing member having two end faces and comprisng push-pull bearings being provided at each of its end faces, each with a pattern of helical grooves which produces a negative pressure.

8. An X-ray tube as claimed in claim 5, wherein said bearing member has two axial faces and said rotary shaft is provided with a counterweight at a side of said bearing member which is remote from said anode disc so that the center of gravity of the bearing-disc combination is situated at least substantially halfway between the two axial faces of said bearing member.

9. An X-ray tube as claimed in claim 1, wherein an anode shaft and an intermediate ceramic structural material support the anode disc in the tube.

10. An X-ray tube as claimed in claim 9, wherein a cooling device for said anode disc and said bearing member limits the temperature of said anode disc and said bearing member for precise, stable positioning of a target for an electron beam on said anode disc.

* * * * *